(12) United States Patent
Boice et al.

(10) Patent No.: US 6,999,511 B1
(45) Date of Patent: *Feb. 14, 2006

(54) DYNAMICALLY SWITCHING QUANT MATRIX TABLES WITHIN AN MPEG-2 ENCODER

(75) Inventors: Charles Edward Boice, Endicott, NY (US); James David Greenfield, Binghamton, NY (US); John Mark Kaczmarczyk, Endicott, NY (US); Agnes Yee Ngai, Endwell, NY (US); Stephen Philip Pokrinchak, Owego, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 597 days.

(21) Appl. No.: 09/255,892

(22) Filed: Feb. 23, 1999

(51) Int. Cl.
*H04B 1/66* (2006.01)

(52) U.S. Cl. ............ 375/240; 375/240.05; 375/240.07; 375/240.04; 375/240.06; 375/240.03; 382/251; 382/235

(58) Field of Classification Search ............... 348/405, 348/419, 395, 420, 458; 386/236, 239; 375/240, 375/240.05, 240.07, 240.04, 240.06, 240.03; 708/650; 382/236, 251, 235

See application file for complete search history.

(56) References Cited

U.S. PATENT DOCUMENTS

| | | | | | |
|---|---|---|---|---|---|
| 5,157,488 | A | * | 10/1992 | Pennebaker | 358/133 |
| 5,422,736 | A | * | 6/1995 | Katayama | 348/420 |
| 5,483,287 | A | * | 1/1996 | Siracusa | 348/426 |
| 5,526,054 | A | * | 6/1996 | Greenfield et al. | 348/467 |
| 5,530,478 | A | * | 6/1996 | Sasaki et al. | 348/405 |
| 5,710,595 | A | * | 1/1998 | Hang et al. | 375/240.05 |
| 5,727,091 | A | * | 3/1998 | Kinouchi et al. | 382/246 |
| 5,781,248 | A | * | 7/1998 | Chida | 348/584 |
| 5,796,438 | A | * | 8/1998 | Hosono | 348/458 |
| 5,825,680 | A | * | 10/1998 | Wheeler et al. | 364/761 |
| 5,847,763 | A | * | 12/1998 | Matsumura et al. | 348/416 |
| 5,987,179 | A | * | 11/1999 | Riek et al. | 382/236 |

* cited by examiner

*Primary Examiner*—Shawn S. An
(74) *Attorney, Agent, or Firm*—William H. Steinberg, Esq.; Kevin P. Radigan, Esq.; Heslin Rothenberg Farley & Mesiti, P.C.

(57) ABSTRACT

A digital video encoder is presented adapted for dynamically switching between sets of quantizer matrix tables without pausing encoding of a stream of video data. Two or more sets of quantizer matrix tables are held at the encoder's quantization unit and compressed store interface for dynamically switching between sets of quant matrix tables at a picture boundary of the sequence of video data, i.e., without stopping encoding of the sequence of video data. Further, while one set of matrix tables is being employed to quantize the stream of video data, the encoder can be updating or modifying another set of quantization matrix tables, again without stopping encoding of the sequence of video data.

29 Claims, 11 Drawing Sheets

CASE 1

MATRIX TABLE SET 1 — 270

| DEFAULT INTRA LUMINANCE 271 | DEFAULT INTRA CHROMINANCE 273 |
|---|---|
| DEFAULT NON-INTRA LUMINANCE 272 | DEFAULT NON-INTRA CHROMINANCE 274 |

MATRIX TABLE SET 2 — 280

| CUSTOM INTRA LUMINANCE 275 | CUSTOM INTRA CHROMINANCE 277 |
|---|---|
| CUSTOM NON-INTRA LUMINANCE 276 | CUSTOM NON-INTRA CHROMINANCE 278 |

CASE 2

MATRIX TABLE SET 1

| CUSTOM INTRA LUMINANCE | CUSTOM INTRA CHROMINANCE |
|---|---|
| CUSTOM NON-INTRA LUMINANCE | CUSTOM NON-INTRA CHROMINANCE |

MATRIX TABLE SET 2

| CUSTOM INTRA LUMINANCE | CUSTOM INTRA CHROMINANCE |
|---|---|
| CUSTOM NON-INTRA LUMINANCE | CUSTOM NON-INTRA CHROMINANCE |

CASE 3

MATRIX TABLE SET 1

| DEFAULT INTRA LUMINANCE | DEFAULT INTRA CHROMINANCE |
|---|---|
| DEFAULT NON-INTRA LUMINANCE | DEFAULT NON-INTRA CHROMINANCE |

MATRIX TABLE SET 2

| DEFAULT INTRA LUMINANCE | CUSTOM INTRA CHROMINANCE |
|---|---|
| CUSTOM NON-INTRA LUMINANCE | CUSTOM NON-INTRA CHROMINANCE |

CASE 4

MATRIX TABLE SET 1

| DEFAULT INTRA LUMINANCE | CUSTOM INTRA CHROMINANCE |
|---|---|
| DEFAULT NON-INTRA LUMINANCE | CUSTOM NON-INTRA CHROMINANCE |

MATRIX TABLE SET 2

| CUSTOM INTRA LUMINANCE | DEFAULT INTRA CHROMINANCE |
|---|---|
| CUSTOM NON-INTRA LUMINANCE | DEFAULT NON-INTRA CHROMINANCE |

*fig. 7*

DYNAMICALLY SWITCHING QUANT MATRIX TABLES WITHIN AN MPEG-2 ENCODER

TECHNICAL FIELD

This invention relates in general to an apparatus and method for encoding digital visual images including spatial (intra-picture) and temporal (inter-picture) compression, that is reducing both redundancy within a picture and redundancy between pictures. Redundancy within pictures is reduced, or even eliminated, by the use of the discrete cosine transform, quantization, and variable length encoding. Redundancy between pictures is reduced, or even eliminated, through the use of motion vectors. This invention is more particularly directed to an enhanced encoder adapted to allow a user to switch and update quantization matrix tables in real time while encoding a stream of video data.

BACKGROUND OF THE INVENTION

Within the past decade, the advent of world-wide electronic communications systems has enhanced the way in which people can send and receive information. In particular, the capabilities of real-time video and audio systems have greatly improved in recent years. In order to provide services such as video-on-demand and video conferencing to subscribers, an enormous amount of network bandwidth is required. In fact, network bandwidth is often the main inhibitor in the effectiveness of such systems.

In order to overcome the constraints imposed by networks, compression systems have emerged. These systems reduce the amount of video and audio data which must be transmitted by removing redundancy in the picture sequence. At the receiving end, the picture sequence is uncompressed and may be displayed in real-time.

One example of a video compression standard is the Moving Picture Experts Group ("MPEG") standard. Within the MPEG standard, video compression is defined both within a given picture and between pictures. Video compression within a picture is accomplished by conversion of the digital image from the time domain to the frequency domain by a discrete cosine transform, quantization, variable length coding, and Huffman coding. Video compression between pictures is accomplished via a process referred to as motion estimation, in which a motion vector plus difference data is used to describe the translation of a set of picture elements (pels) from one picture to another.

The ISO MPEG2 standard specifies only the syntax of bitstream and semantics of the decoding process. The choice of coding parameters and tradeoffs in performance versus complexity are left to the encoder developers.

Users of MPEG encoders often desire the ability to change quantization matrix tables between pictures in a sequence of video data. For example, based upon a change in picture complexity from one frame to the next, a user may wish to modify the amount of quantization by changing the quantization matrix tables. To change matrix tables, sufficient time is needed to load the values of the new tables into the quantization unit of the encoder. As a result of the time required to load these values, the switching of matrix tables today cannot be accomplished in real time mode. The user is limited to pausing the encoding, loading the tables and then continuing with the encode process.

In view of the above, and in order to establish commercial advantage, a novel design is desired wherein an encoder is adapted to allow dynamic (i.e., real time) switching of quantization matrix tables without interfering with the encode process.

DISCLOSURE OF THE INVENTION

Briefly described, this invention comprises in one aspect an encoder for encoding a sequence of video data. The encoder includes storage for holding multiple sets of quantization matrix tables. A quantizer quantizes the sequence of video data using one set of the multiple sets of quantization matrix tables. Means are also provided for dynamically switching the quantizer from using the one set of quantization matrix tables to using another set of quantization matrix tables of the multiple sets of quantization matrix tables.

In another aspect, the invention comprises a method for encoding a sequence of video data. The method includes: providing storage for holding multiple sets of quantization matrix tables; quantizing the sequence of video data using one set of quantization matrix tables of the multiple sets of quantization matrix tables; and dynamically switching the quantizer from using the one set of quantization matrix tables to using another set of quantization matrix tables of the multiple sets of tables.

In a further aspect, an article of manufacture is provided which includes a computer program product comprising computer usable medium having computer readable program code means therein for use in encoding a sequence of video data. The computer readable program code means in the computer program product includes: computer readable program code means for causing a computer to effect storing multiple sets of quantization matrix tables; computer readable program code means for causing a computer to effect quantizing the sequence of video data using one set of quantization matrix tables of the multiple sets of quantization matrix tables; and computer readable program code means for causing a computer to effect dynamically switching the quantizing from using the one set of quantization matrix tables to using another set of quantization matrix tables of the multiple sets of quantization matrix tables.

To restate, provided herein is an encoder and encode process adapted to allow a user to switch quantization matrix tables in real time while encoding a stream of video data. By providing the encoder with two sets of quantization matrix tables, for example, held in the quantization unit and the compressed store interface, significant new flexibility is attained. The flexibility to swap tables on the fly, for example, between default and custom matrix tables is provided, as well as the flexibility to modify selected tables within a given set of tables. Further, a user is provided with the flexibility to optimize picture quality based on the quantization matrix tables desired. While one set of matrix tables is being employed by the quantization unit, the encoder can be updating or modifying another set of quantization matrix tables, which after a few pictures can be switched to for use by the quantizer in quantizing the sequence of video data. This dynamic modifying of sets of tables and switching between sets of tables provides significant commercial advantage to an encoder implemented in accordance with the principles of this invention.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIG. 7 shows various examples of combinations of sets of quant matrix tables which can be employed in accordance with the present invention.

BEST MODE FOR CARRYING OUT THE INVENTION

Figure 1:
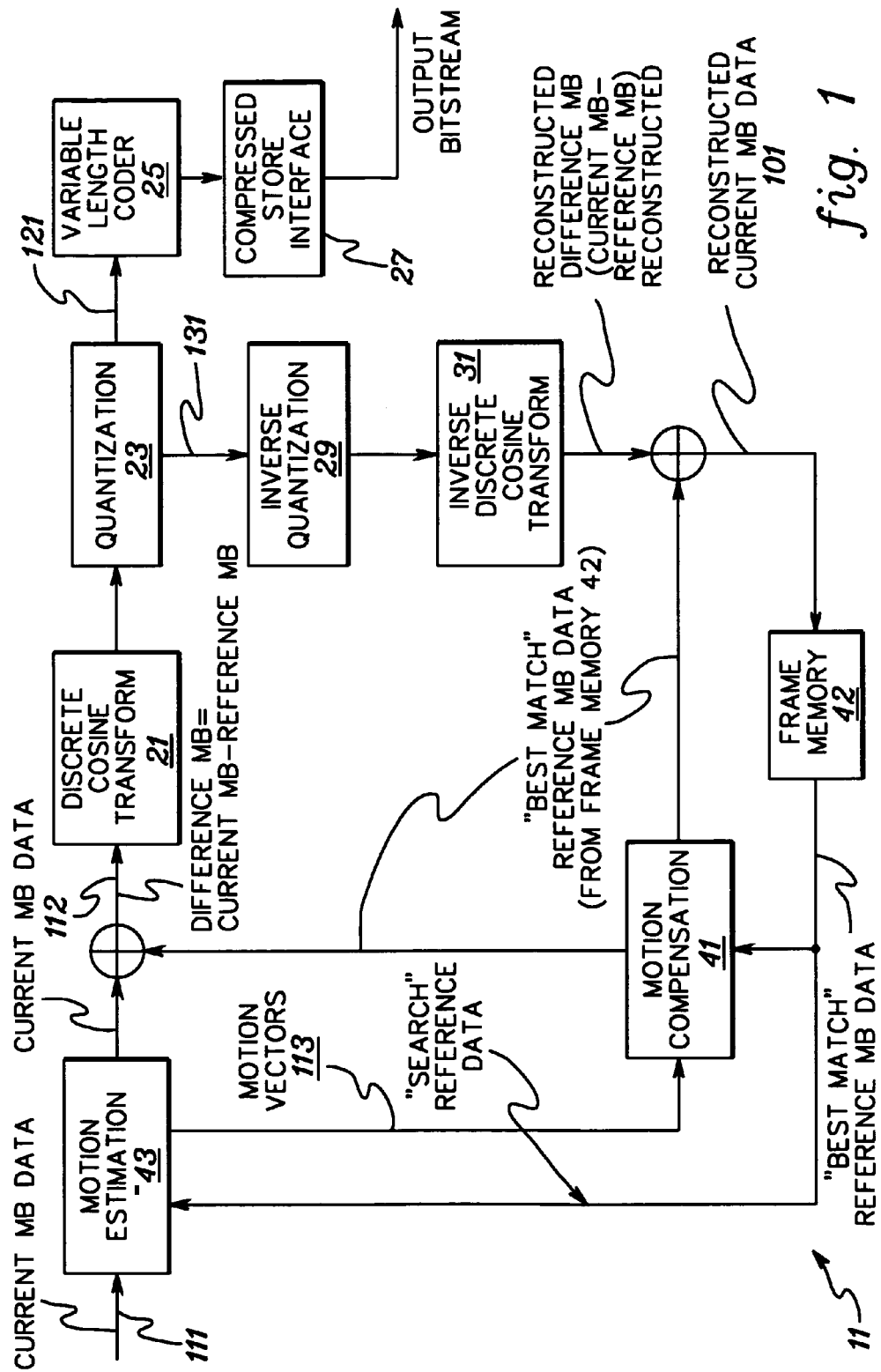
FIG. 1 shows a flow diagram of a generalized MPEG2 compliant encoder 11, including a discrete cosine transformer 21, a quantizer 23, a variable length coder 25, compressed store interface 27, an inverse quantizer 29, an inverse discrete cosine transformer 31, motion compensation 41, frame memory 42, and motion estimation 43. The data paths include the picture input 111, difference data 112, motion vectors 113, the picture output 121, the feedback picture for motion estimation and compensation 131, and the reconstructed picture 101. This figure has the assumptions that the $i^{th}$ picture exists in Frame Memory or Frame Store 42, and that the $i+1^{th}$ picture is being encoded with motion estimation.

The invention relates to scalable MPEG and HDTV compliant encoders and encoding processes. The encoding functions performed by the encoder include data input, spatial compression, motion estimation, macroblock type generation, data reconstruction, entropy coding, and data output. Spatial compression includes discrete cosine transformation (DCT), quantization, and entropy encoding. Temporal compression includes intensive reconstructive processing, such as inverse discrete cosine transformation, inverse quantization, and motion compensation. Motion estimation and compensation are the temporal compression functions. Spatial and temporal compression are repetitive functions with high computational requirements.

More particularly the invention relates to a processor for performing spatial and temporal compression including discrete cosine transformation, quantization, entropy encoding, motion estimation, motion compensation, and prediction, and even more particularly to a system for accomplishing spatial and temporal compression.

The scalable processor system has an I-frame only video encoder module with a Discrete Cosine Transform processor, a quantization unit, a variable length encoder, a FIFO buffer, and a compressed store interface. The system also includes a second processor element, that is, an R-processor or Reconstruction processor with a reference memory interface, motion estimation and compensation capability, inverse quantization, and inverse discrete cosine transformation, and motion compensation means; and at least one third processor element for motion estimation. The system can be in the form of a single integrated circuit chip, or a plurality of integrated circuit chips, that is one for each processor, the I-frame video encoder module, the second processor element, and the third processor element. There can be one or more of the third processor units.

The first compression step is the elimination of spatial redundancy, for example, the elimination of spatial redundancy in a still picture of an "I" frame picture. Spatial redundancy is the redundancy within a picture. Because of the block based nature of the motion compensation process, described below, it was desirable for the MPEG-2 Standard to use a block based method of reducing spatial redundancy. The method of choice is the Discrete Cosine Transformation, and Discrete Cosine Transform coding of the picture. Discrete Cosine Transform coding is combined with weighted scalar quantization and run length coding to achieve still further levels of compression.

The Discrete Cosine Transformation is an orthogonal transformation. Orthogonal transformations, because they have a frequency domain interpretation, are filter bank oriented. The Discrete Cosine Transformation is also localized. That is, the encoding process samples on an 8×8 spatial window which is sufficient to compute 64 transform coefficients or sub-bands.

Another advantage of the Discrete Cosine Transformation is that fast encoding and decoding algorithms are available. Additionally, the sub-band decomposition of the Discrete Cosine Transformation is sufficiently well behaved to allow effective use of psychovisual criteria.

After transformation, many of the frequency coefficients are zero, especially the coefficients for high spatial frequencies. These coefficients are organized into a zig-zag pattern, and converted into run-amplitude (run-level) pairs. Each pair indicates the number of zero coefficients and the amplitude of the non-zero coefficient. This is coded in a Variable Length Code.

Motion compensation is used to reduce or even eliminate redundancy between pictures. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the $i^{th}+1$ picture will be in the $i^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

For purposes of illustration, a generalized flowchart of MPEG compliant encoding is shown in FIG. 1. In the flowchart the images of the $i^{th}$ picture and the $i+1^{th}$ picture are processed to generate motion vectors. The motion vectors predict where a macroblock of pixels will be in a prior and/or subsequent picture. The use of the motion vectors instead of full images is a key aspect of temporal compression in the MPEG and HDTV standards. As shown in FIG. 1 the motion vectors, once generated, are used for the translation of the macroblocks of pixels, from the $i^{th}$ picture to the $i+1^{th}$ picture.

As shown in FIG. 1, in the encoding process, the images of the $i^{th}$ picture and the $i+1^{th}$ picture are processed in the encoder 11 to generate motion vectors which are the form in which, for example, the $i+1^{th}$ and subsequent pictures are encoded and transmitted. An input image 111 of a subsequent picture goes to the Motion Estimation unit 43 of the encoder. Motion vectors 113 are formed as the output of the Motion Estimation unit 43. These vectors are used by the Motion Compensation Unit 41 to retrieve macroblock data from previous and/or future pictures, referred to as "reference" data, for output by this unit. One output of the Motion Compensation Unit 41 is negatively summed with the output from the Motion Estimation unit 43 and goes to the input of the Discrete Cosine Transformer 21. The output of the Discrete Cosine Transformer 21 is quantized in a Quantizer 23. The output of the Quantizer 23 is split into two outputs, 121 and 131; one output 121 goes to a downstream element 25 for further compression and processing, such as to a run length encoder; and then to another element 27, i.e., a compressed store interface, for processing before transmission. The other output 131 goes through reconstruction of the encoded macroblock of pixels for storage in Frame Memory 42. In the encoder shown for purposes of illustration, this second output 131 goes through an inverse quantization 29 and an inverse discrete cosine transform 31 to return a lossy version of the difference macroblock. This data is summed with the output of the Motion Compensation unit 41 and returns a lossy version of the original picture to the Frame Memory 42.

Figure 2:
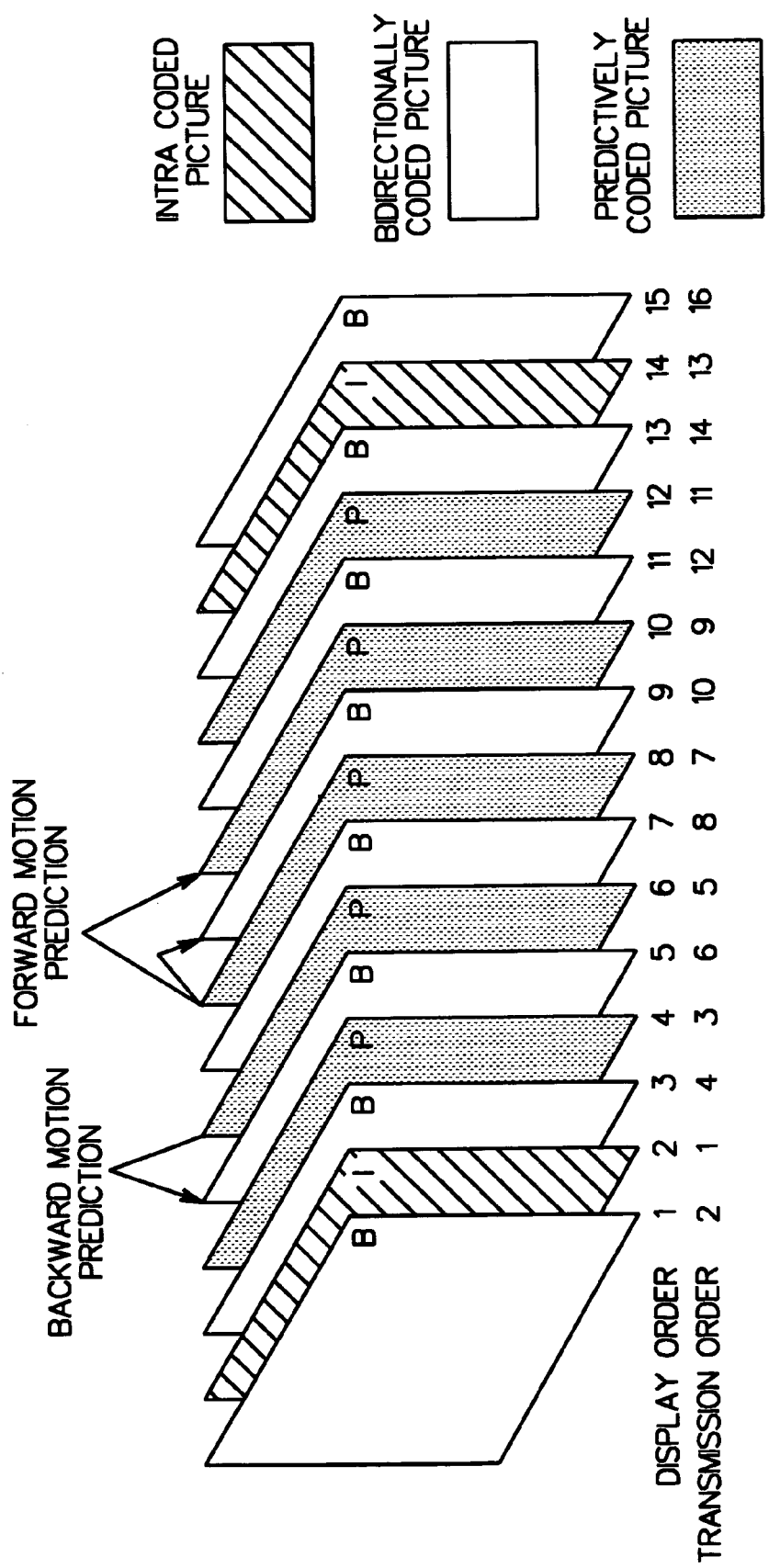
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a source of motion vectors. There are "Predicted pictures" or "P" pictures which are formed by motion vectors from a previous picture and can serve as a source of motion vectors for further pictures.

Finally, there are "Bidirectional pictures" or "B" pictures which are formed by motion vectors from two other pictures, one past and one future, and can not serve as a source of motion vectors. Motion vectors are generated from "I" and "P" pictures, and are used to form "P" and "B" pictures. "P" and "B" pictures are also referred to as "Nonintra" or "Inter" pictures.

Figure 3:
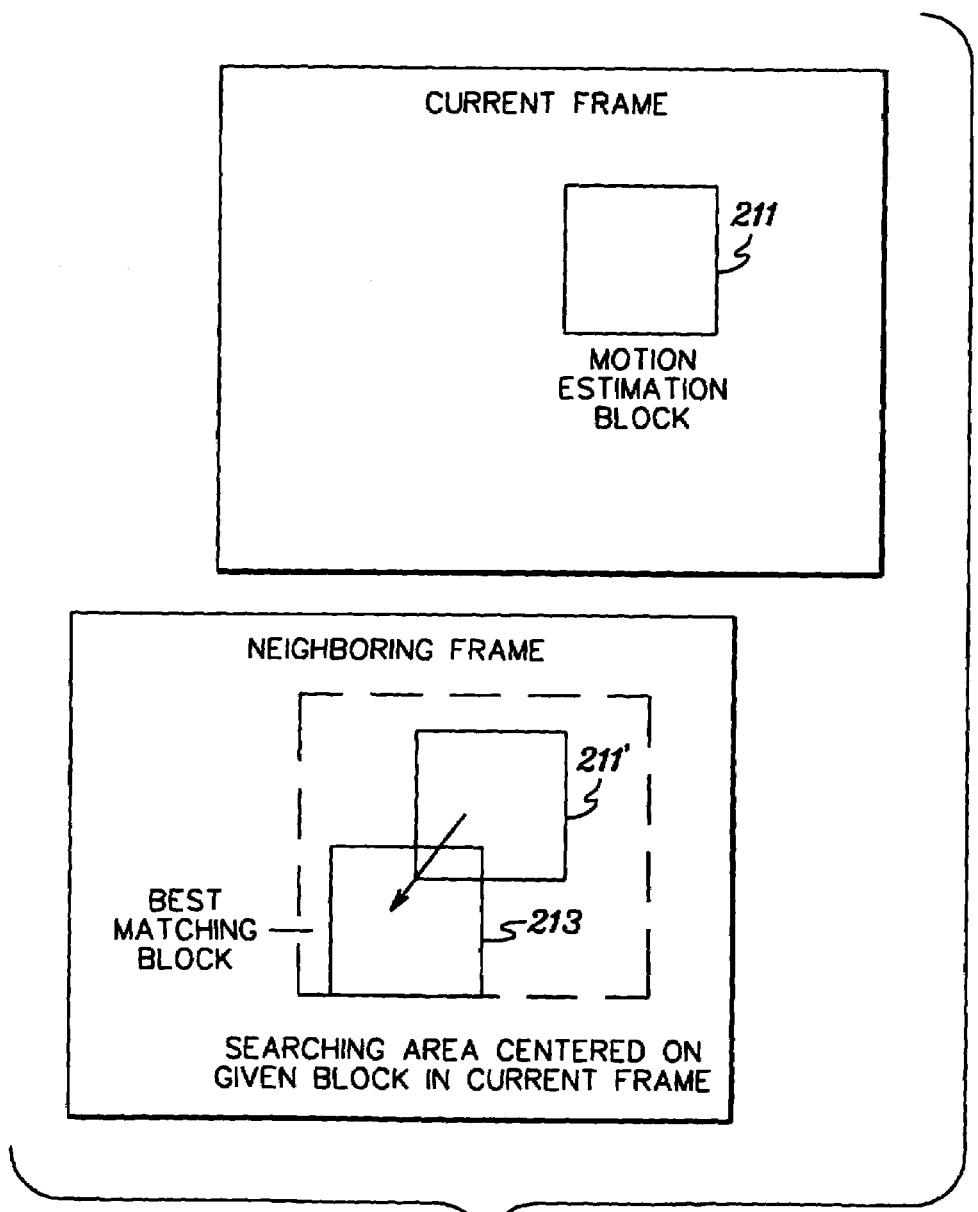
FIG. 3 illustrates the search from the motion estimation block in the current frame or picture to the best matching block in a subsequent or previous frame or picture. Elements 211 and 211' represent the same location in both pictures.
Figure 4:
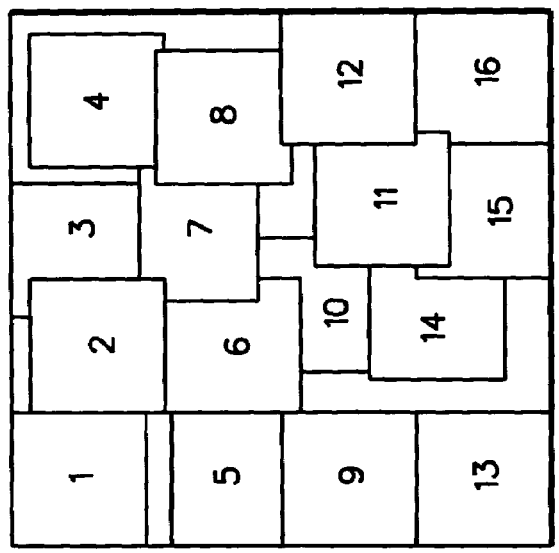
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an $i^{th}+1$ picture throughout a region of the previous picture to find the best match macroblock 213 (211' is the same location as 211 but in the previous picture). Translating the macroblocks in this way yields a pattern of macroblocks for the $i+1^{th}$ picture, as shown in FIG. 4. In this way the $i^{th}$ picture is changed a small amount, e.g., by motion vectors and difference data, to generate the $i+1^{th}$ picture. What is encoded are the motion vectors and difference data, and not the $i+1^{th}$ picture itself. Motion vectors translate position of an image from picture to picture, while difference data carries changes in chrominance, luminance, and saturation, that is, changes in color and brightener.

Returning to FIG. 3, we look for a good match by starting from the same location in the $i^{th}$ picture 211' as in the $i+1^{th}$ picture. A search window is created in the $i^{th}$ picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

The operational functions of an MPEG2 encoder are implemented in three basic devices: an I or Intra device, an R or Reconstruction or Reference device, and an S or Search device. The functions are partitioned according to application needs, silicon size, tools and design complexity, and performance. The I, R and S devices are described in detail in a co-pending, commonly assigned United States patent application by Murdock et al., entitled "Macroblock Bit Regulation Schemes For Video Encoder," Ser. No. 08/859, 544, the entirety of which is hereby incorporated herein by reference.

As noted briefly above, the present invention is directed to providing MPEG encoders with the capability to dynamically change quantization matrix tables at a picture boundary while encoding a stream of video data. Conventionally, quantizer 23 (FIG. 1) and compressed store interface 27 (FIG. 1) reference one set of matrix tables during the encoding of a stream of video data. The matrix tables are a set of two or four tables, each table containing 64 values. In 4:2:0 mode, two tables are used, one for intra blocks and the other for non-intra blocks. In 4:2:2 mode, four tables are used, one for intra luminance blocks, one for non-intra luminance blocks, one for intra chrominance blocks, and the last for non-intra chrominance blocks. To change a set of matrix tables between picture boundaries, enough time is needed to load 256 values into the encoder. As a result of this time requirement, switching of matrix tables is conventionally not done in real-time mode. A user is limited to pausing the encoder, loading the tables and then continuing the encoding.

Figure 5:
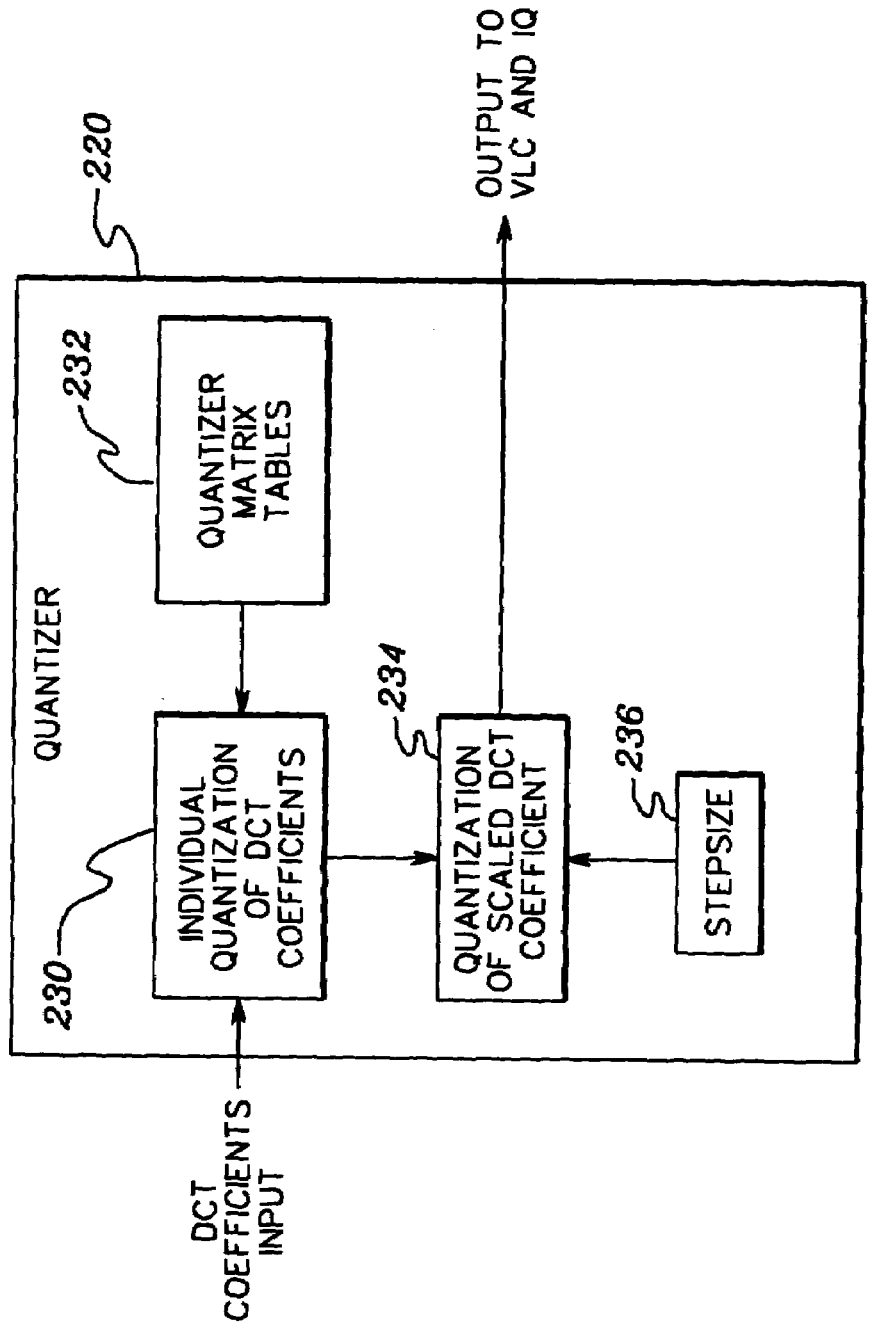
FIG. 5 depicts one embodiment of a quantization unit to be modified in accordance with the principles of the present invention.

FIG. 5 presents one embodiment of a conventional quantizer 220 of an MPEG encoder. Quantizer 220 is responsible for quantizing the DCT coefficients from the DCT processor and then sending the coefficients to variable length coder (VLC) 25 and inverse quantization (IQ) 29 (FIG. 1). Quantization involves scaling the DCT coefficients in a two-step process per MPEG Standard. The DCT coefficients are initially input to an "individual quantization of DCT coefficients" logic block 230, which quantizes each coefficient based on its relative location within the subject block of the macroblock. This quantization is made with reference to a weight value stored in quantizer matrix tables 232 in the quantizer unit 220. The quantizer processes one block of a macroblock at a time. There are six blocks in a 4:2:0 macroblock and eight blocks in a 4:2:2 macroblock. Thus, the first step is a quantization of each coefficient based on its relative location in the 8×8 block of the 16×16 macroblock.

The second quantization step is scaling all coefficients in the macroblock. This "quantization of scaled DCT coefficients" 234 comprises an overall quantization which is set by the processor in consideration, for example, of the bit rate. This scaling is made with reference to a selected stepsize or MQUANT 236. The stepsize can be adjusted depending upon whether the bit rate is above or below a target bit rate. Output again is to the variable length encoder 25 (FIG. 1).

Figure 6:
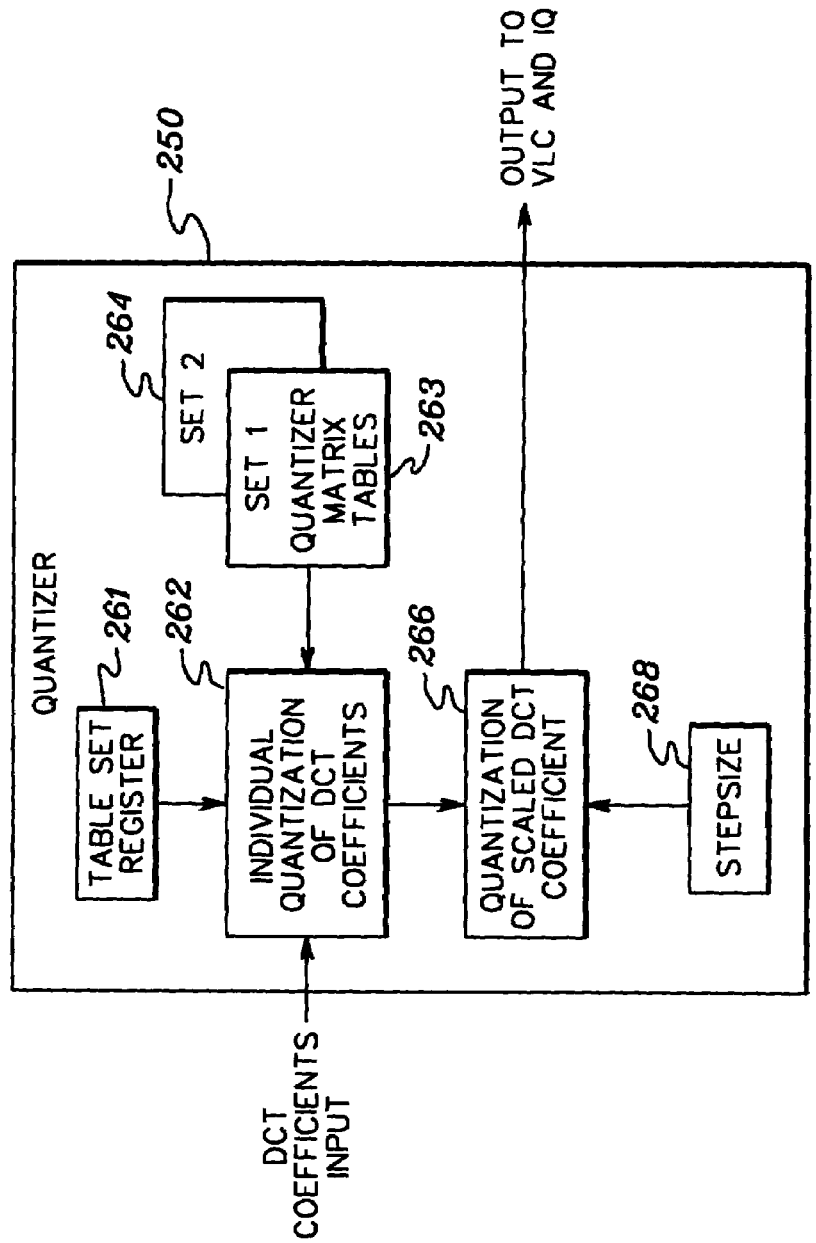
FIG. 6 depicts one embodiment of a quantization unit or quantizer 250 employing multiple sets of quantizer matrix tables in accordance with the present invention.

Pursuant to the present invention, quantization unit 220 is modified to include memory space for multiple sets of quantizer matrix tables. FIG. 6 depicts one example of a quantizer 250 in accordance with this invention. Again, quantizer 250 is responsible for quantization (i.e., scaling down) of DCT coefficients. DCT coefficient input from the discrete cosine transform unit is received in individual quantization block 262 where each coefficient is scaled down based on a scaling factor dependent on the coefficient's coordinates in the block.

Memory is provided within quantizer 250 for holding at least a first set of quantizer matrix tables 263 and a second set of quantizer matrix tables 264. Set 263 comprises one complete set of quantizer matrix tables (four tables per set in 4:2:2 format) used by the individual quantization logic 262, while set 264 also comprises one complete set of quantizer matrix tables for use by the individual quantization logic 262. By way of example, selection of set 263 or set 264 can be controlled through use of a 1 bit table set register 261 within the quantizer. After individual quantization of DCT coefficients, all coefficients are scaled by logic 266 using the same scale factor or stepsize 268. Output from quantizer 250 is again to the variable length coder and the inverse quantizer.

As noted, in accordance with the principles of this invention, the quantization unit has storage capacity to hold at least two complete sets of quant matrix tables. (Note that if desired, greater than two sets of quantizer matrix tables could be provided within a quantizer in accordance with the present invention.) In 4:2:2 mode, each set consists of an intra luminance matrix table, a non-intra luminance matrix table, an intra chrominance matrix table, and a non-intra chrominance matrix table.

FIG. 7 depicts four examples of various matrix table sets which could be employed in a quantizer in accordance with this invention. Matrix table set 1 270 comprises a first complete quantizer matrix set of four tables, and matrix table set 2 280 comprises a second complete quantizer matrix set of four tables. In these examples, default intra luminance table 271 is a default table from the MPEG standard for intra luminance. Default non-intra luminance table 272 is a default table from the MPEG standard for non-intra luminance. Default intra chrominance table 273 is a default table from the MPEG standard for intra chrominance, while default non-intra chrominance table 274 is a default table from the MPEG standard for intra chrominance. In matrix table set 2 280 of case 1, multiple user defined custom tables are provided. Specifically, custom intra luminance table 275 comprises a user defined custom table for intra luminance, custom non-intra luminance table 276 is a user defined custom table for non-intra luminance, custom intra chrominance table 277 is a user defined custom table for intra chrominance, and custom non-intra chrominance table 278 is a user defined custom table for non-intra chrominance. As shown in the various cases of FIG. 7, any combination of default and custom quant matrix tables can be employed pursuant to this invention within the at least two different matrix table sets 270 & 280.

In one embodiment, during encoder chip power-on reset and initialization, the default quant matrix tables per MPEG standard are loaded into both sets of tables within the quantization unit, i.e., sets 263 & 264 of FIG. 6. Also during initialization, the user has the ability to load over any default quant matrix tables with custom quant matrix tables, referred to herein as user specified custom quant matrix tables. Either an entire set of default tables (i.e., four tables) can be overwritten or only one or more of the default tables can be customized. In any case, the complete set of tables is referred to as custom requiring them to be outputted in the encoded bitstream before use. The user may customize either or both sets of matrix tables in the quantization unit. Before the picture encoding starts, microcode will set register 261 (FIG. 6) in the quantization unit to indicate which set of matrix tables to use based on user input.

While encoding a picture stream, the user has the ability pursuant to this invention to dynamically switch between the two sets of quant matrix tables at picture gaps. For example, the picture stream may be coming up to a scene change where one set of matrix tables may provide optimal compression of detail over the other set. The user can therefore instruct the microcode to set the register in the quantization unit to switch to the other set of tables during the picture gap, i.e., when no picture is currently being processed through the quantization unit. Because the other set is already loaded within the encoder, i.e., within the quantizer, the switch can be accomplished in real time between pictures without stopping the encoder. In addition, with two sets of tables, the user can load a new set of tables into the unused set while the encoder is processing the stream using the other set. Again, there is no need for stopping the encoder, and this also can be accomplished in real time. In one embodiment, the encoder may incorporate a hardware translation of the matrix coefficients for the quantizer unit. Such a hardware translation would significantly reduce time required to load a matrix table. For example, the user can load one full quantization matrix table on the encoder command stack and have it loaded into the quantizer unit during a single picture gap. Using this technique, all four matrix tables in a set can be loaded within four picture gaps.

Figures 8A, 8B:
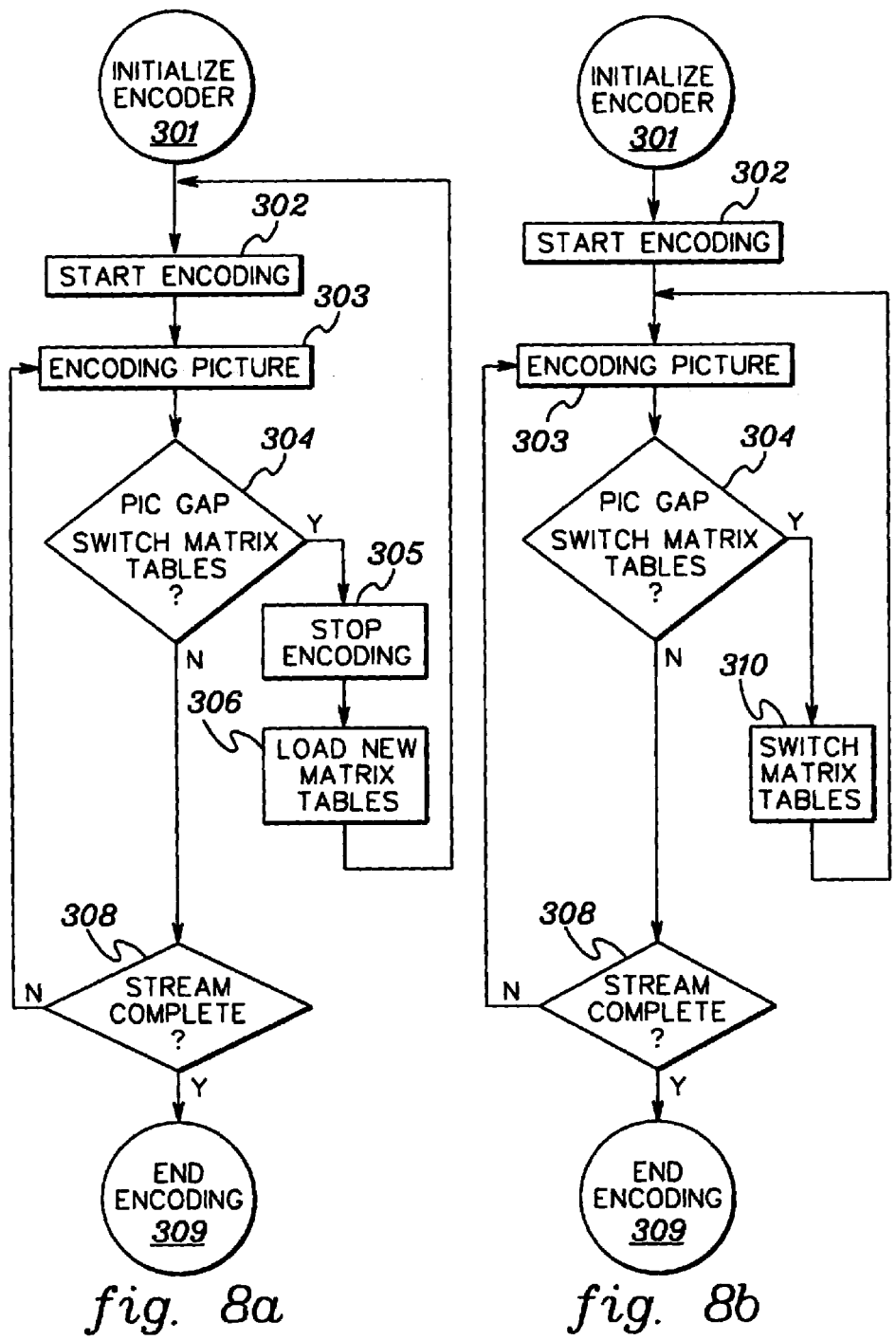
FIG. 8a shows a flowchart of conventional encoder processing when new quant matrix tables are to be loaded.
FIG. 8b depicts a flowchart of encoder processing allowing dynamic switching between sets of matrix tables in accordance with the principles of the present invention.

FIG. 8a presents one embodiment of processing flow within a standard encoder when quant matrix tables are to be switched, and FIG. 8b depicts process flow in accordance with the principles of the present invention. In the conventional encoder process of FIG. 8a, the encoder is initialized 301 at power on reset by loading microcode, encoding parameters and quantizer matrix tables. After initialization, picture encoding commences 302 and proceeds to encode each picture of a stream of video data 303. At a picture gap, i.e., at a point between pictures in the stream of video data, processing determines whether the user wishes to switch matrix tables 304. Again, between pictures there is no picture data or coefficients flowing through the quantizer. If the user wishes to switch the quant matrix tables, then encoding stops or pauses 305 to allow sufficient time to load the new matrix tables 306. The new matrix tables are loaded either from a user or from an external storage which has previously been setup by the user. Thereafter, encoding can be recommenced 302 and the next picture encoded 303. At the next picture gap 304, if the user does not wish to switch matrix tables, processing inquires whether encoding of the stream of video data has been completed 308. If no, then the next picture is encoded 303. Otherwise, the process is complete since there are no more pictures to encode 309.

In contrast, the encoding flow of FIG. 8b presents a simplified process in that once two or more sets of quantizer matrix tables are held within the quantizer, the encoder can switch between matrix tables in real time 310 if a user wishes to switch the tables at a picture boundary. Again, there is no need to stop the encode process since switching is accomplished in real time simply by changing a bit within, for example, a register within the quantizer. Further, in accordance with the principles of the present invention the encode process could switch back to the first set of quant matrix tables, or could load a further set of quant matrix tables into the storage space for the first set while using the second set of matrix tables.

Figure 9:
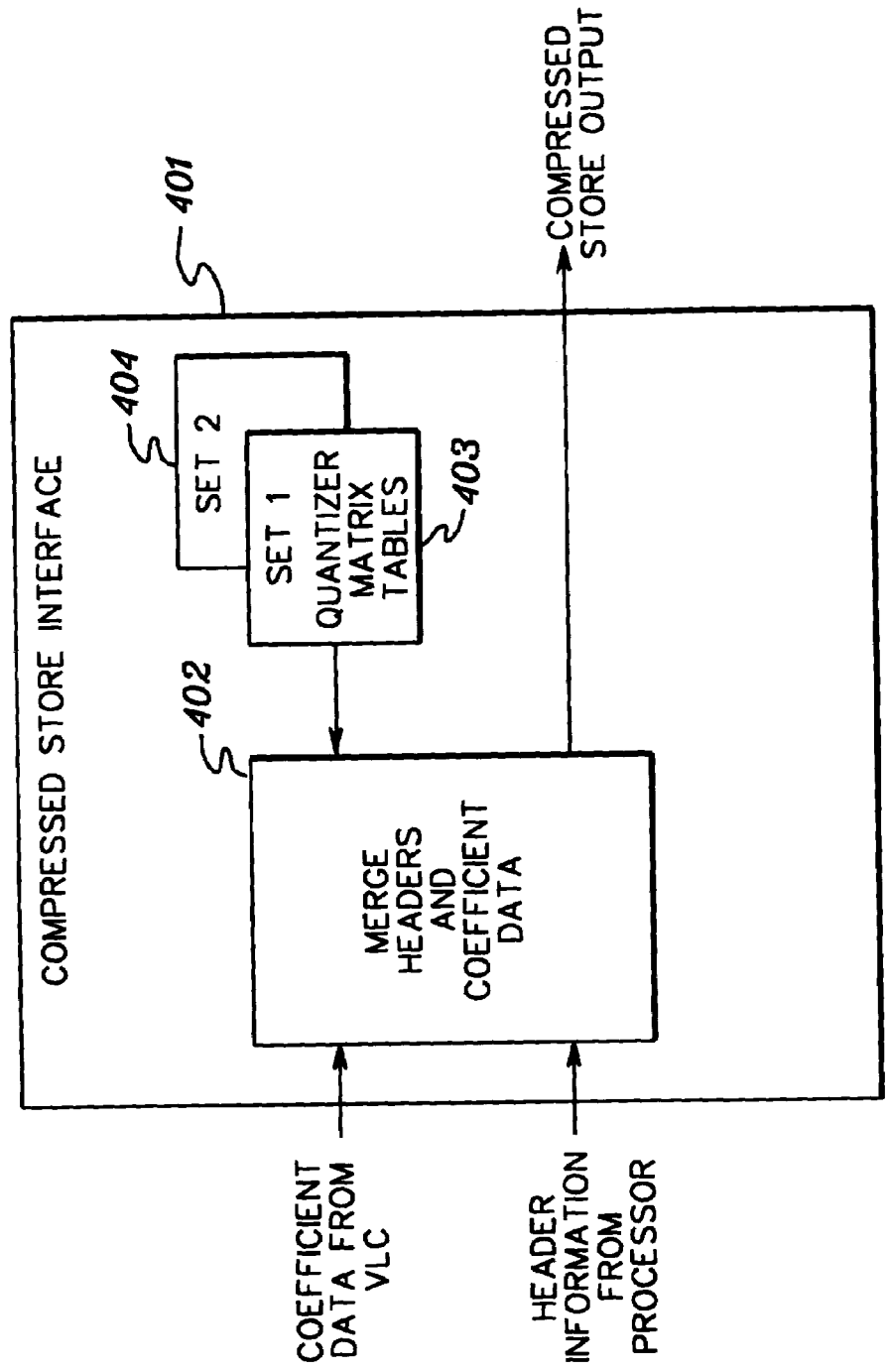
FIG. 9 depicts one embodiment of a compressed store interface unit 401 which stores or has access to multiple sets of quantizer matrix tables in accordance with the present invention.

As noted above, the compressed store interface unit 27 (FIG. 1) in accordance with the present invention also has access to both sets of quantization matrix tables. FIG. 9 depicts one embodiment of a compressed store interface unit 401 in accordance with this invention. Unit 401 outputs the compressed bitstream from a merge headers and coefficient data logic block 402. Logic 402 is a hardware area that combines start codes and macroblock data to form the output bitstream. The logic receives as input coefficient data or macroblock data from the variable length coder, as well as header information from the processor, which indicates which MPEG start codes are to be included in the compressed bitstream. Logic 402 also has access to the two sets of quantizer matrix tables 403 & 404, which in one embodiment, are held in storage within the compressed store interface 401. Quantizer matrix tables set 403 comprises one complete set of quantizer matrix tables used in the individual quantization step. Again, in one example there are four tables per set. Quantizer matrix tables set 404 also contains one complete set of quantizer matrix tables.

When the matrix table set selected is a custom set, the compressed store interface will place the matrix tables into the output bitstream. Since the table sets are preferably held at interface 401, there is no time delay needed to pass the matrix table values to the compressed store interface for including in the output bitstream. The compressed store interface can select which tables from the set are to be included if all four tables are not used in the encoding. Again, the swapping of tables and including of custom tables in the output bitstream is all accomplished dynamically, i.e., in a real time mode without stopping the encode process.

One embodiment of the compressed store interface process is described in greater detail in U.S. Pat. No. 5,526,054 by Greenfield et al., entitled "Apparatus For Header Generation," the entirety of which is hereby incorporated herein by reference. In this patent, there is described a shared data buffer that can contain either a quantizer matrix table or coefficient data. There is also a section of the header buffer that contains the templates for the quant matrix extension start code. The conventional templates are as follows:

| Command | Data | Output |
|---------|------|--------|
| 010 | Extension Start Code | 000001B5 hex |
| 001 | Quant Matrix Extension Start Code ID | 3 hex |
| 011 | Load Intra Matrix | '1' + 64 byte table |
| 011 | Load non-Intra Matrix | '1' + 64 byte table |
| 011 | Load Chrominance Intra Matrix | '1' + 64 byte table |
| 011 | Load Chrominance non-Intra Matrix | '1' + 64 byte table |

Microcode controls which tables are sent by writing a '1' to the header buffer address that contains the template for a table that is to be sent. The command code "0011" tells the hardware to send the "next" 64 bytes from the shared data buffer. Therefore, matrix tables must conventionally be loaded into the buffer in the order they are to be sent. Once the processor has selected which tables are to be sent it issues a "ship headers" command to the compressed store interface. The compressed store interface hardware then byte-aligns the output bitstream and outputs the quant matrix extension start code ("000001B53" hex followed by up to 4 sets of—a valid bit and 64 bytes of table data).

For the present invention, an additional buffer is added in the compressed store interface unit that can store up to eight quant matrix tables (i.e., 2 sets of four tables). The tables are loaded using a three bit "table ID" which is used as an index into the buffer. Microcode uses the same "table ID" when it selects which tables are to be included in the bitstream. This advantageously allows the encoder to manage two full sets of quant matrix tables without having to stop and reload the tables.

Figure 10:
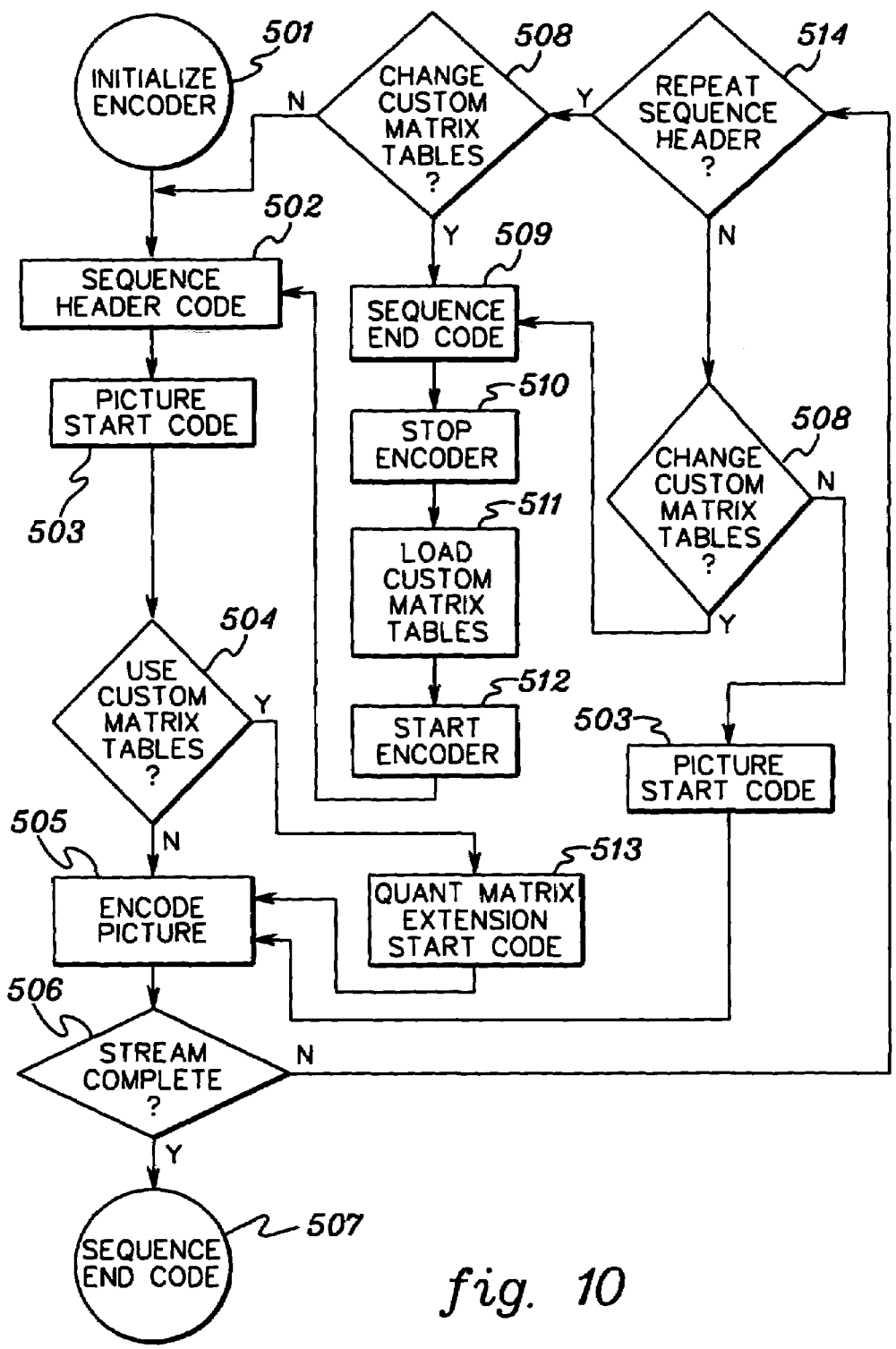
FIG. 10 depicts a flowchart of conventional compressed store interface processing.
Figure 11:
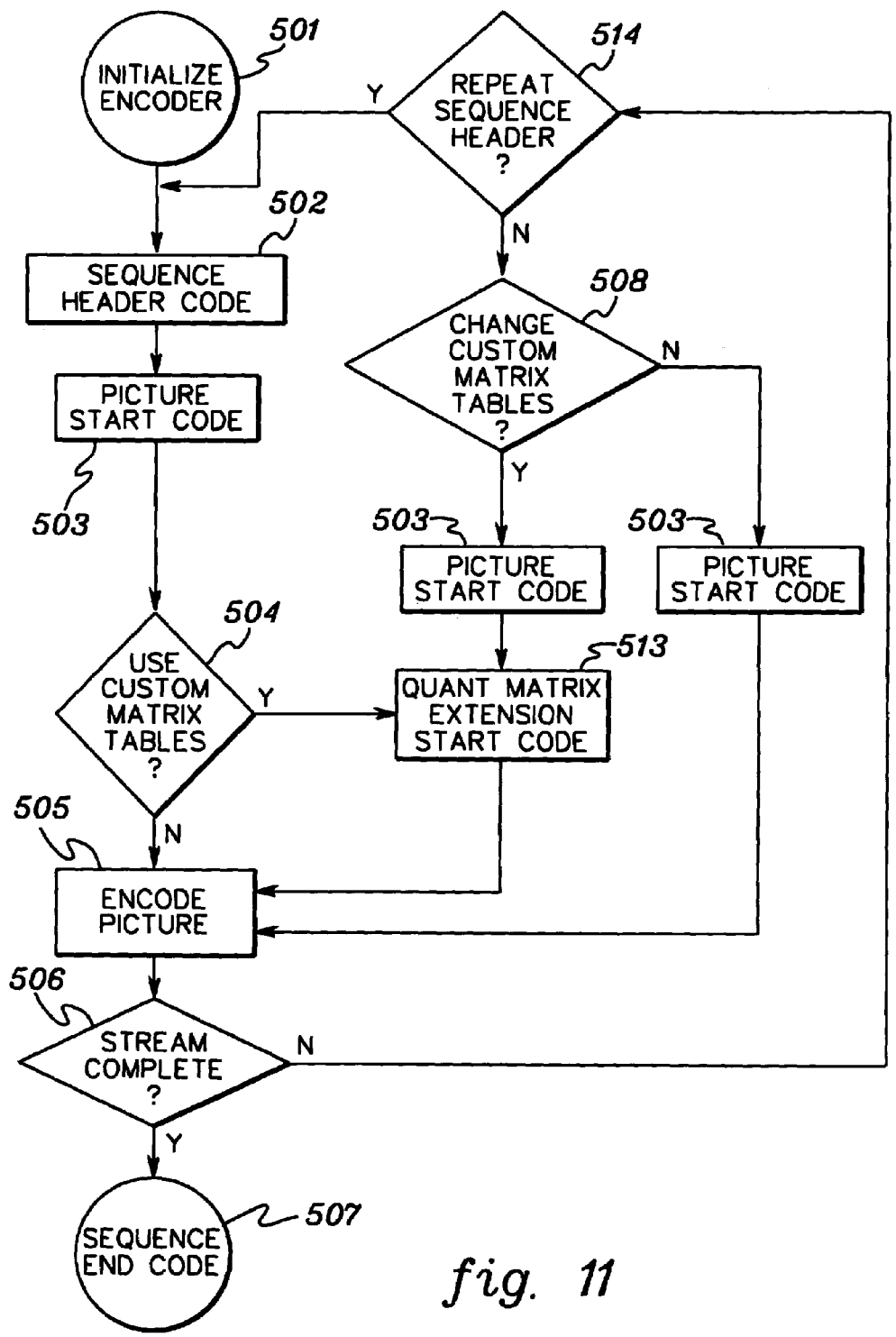
FIG. 11 depicts a flowchart of compressed store interface processing in accordance with the principles of the present invention.

FIG. 10 depicts one embodiment of standard compressed store interface processing, while FIG. 11 depicts compressed store processing employing two sets of matrix tables in accordance with the principles of the present invention. Beginning with FIG. 10, the encoder is initialized, for example, at power on reset by loading microcode and encoding parameters, as well as loading default quantizer matrix tables 501. The encoder outputs a sequence header from the compressed store interface 502, which is followed by the picture start code 503. Processing then determines whether custom matrix tables are to be employed 504, and if no, a picture is encoded 505. The encoder next determines whether the complete stream of video data has been encoded 506, and if yes, outputs a sequence end header 507.

If encoding the stream of video data has not been completed, then processing inquires whether it is time to repeat the sequence header 514. The sequence header again tells a decoder whether to use the default quant matrix tables. If custom matrix tables are desired, then the quant matrix extension must be output again with repeating of the sequence header. If the sequence header is not to be repeated at this picture boundary, then processing determines whether the custom matrix tables are to be changed 508. Again, changing of the custom matrix tables is user specified. If no, then the next picture start code 503 is output and the picture is encoded 505.

If the custom matrix tables are to be changed, then processing outputs a sequence end header from the compressed store interface 509 and stops the encoder 510. In this conventional flow the user has thus instructed the encoder to stop, which is necessary in order to load the new matrix tables. The user must also block uncompressed video input to the encoder. The custom matrix tables are loaded 511 and the encoder is restarted to allow passing of uncompressed video input to the encoder 512, after which a sequence header code is output 502 from the compressed store interface.

Finally, if the sequence header is to be repeated 514, and custom matrix tables are also being switched, then processing outputs the end sequence code 509 and proceeds as described above. Otherwise, the next sequence header code 502 is output, followed by picture start code 503.

In the compressed store processing flow of FIG. 11, the encoder is initialized 501, followed by output of a sequence header from the compressed store interface 502 and a picture header 503. Processing determines whether custom matrix tables are to be employed 504. If yes, then the quantizer matrix extension start code 513 is output from the compressed store interface. Again, this code includes any custom matrix tables. The picture is then encoded 505, after which processing determines whether the complete stream of video data has been encoded 506. If yes, a sequence end header is output from the compressed store interface. Otherwise, processing determines whether it is time to repeat the sequence header 514, and if yes, the sequence header code is output 502, followed by the next picture start code 503. If the sequence header is not to be repeated, processing determines whether the custom matrix tables are to be changed 508. If no, then the compressed store interface simply outputs the next start picture code 503 and the encoder encodes the picture 505. If the custom matrix tables are to be changed, then from inquiry 508 the compressed store interface outputs a picture header 503, followed by the quant matrix extension start code 513, again including any new custom matrix tables.

The following scenario will demonstrate the flexibility of an encoder implemented in accordance with the principles of the present invention. The encoder is initialized and default tables are loaded into set 1 and set 2 of the quant matrix tables. The user loads a custom matrix table into set 2 and begins encoding. At a picture boundary, the user issues the command to switch from set 1, which is a default set, to set 2, which as noted, comprises custom tables. After a few pictures, the user switches back to the default matrix tables and begins loading a new set of custom tables into set 2 at picture boundaries of the stream of video data. After a few pictures, the user switches back to set 2 and starts loading another custom matrix set into set 1. During this whole scenario, the encoder is processing data in a real time mode, i.e., without stopping or pausing.

With the encoder's use of two sets of quantization matrix tables, significant new flexibility is provided. The flexibility to swap tables on the fly between default and custom matrix tables is provided, as well as the flexibility to modify only selected tables within a given set. Further, the user is provided with flexibility to optimize picture quality based on the quantization matrix tables desired.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. An encoder for encoding a sequence of video data, said encoder comprising:
   storage within a quantizer for holding multiple sets of quantization matrix tables at the same time, wherein said multiple sets of quantization matrix tables comprise separate, independent sets of quantization matrix tables, each set of quantization matrix tables comprising at least one intra matrix table and at least one non-intra matrix table;
   said quantizer for quantizing said sequence of video data in a single pass using at least one set of quantization matrix tables of said multiple sets of quantization matrix tables; and
   means for dynamically switching in real time said quantizer during said single pass quantizing from using said one set of quantization matrix tables to using another set of quantization matrix tables of said multiple sets of quantization matrix tables, wherein said dynamically switching occurs without requiring stopping of the encoding process; and
   means for allowing updating of said one set of quantization matrix tables of said multiple sets of quantization matrix tables within said quantizer while said another set of quantization matrix tables is in use by said quantizer.

2. The encoder of claim 1, wherein said means for dynamically switching comprises means for switching said quantizer from using said one set of quantizer matrix tables to using said another set of quantizer matrix tables at a picture boundary of said sequence of video data.

3. The encoder of claim 2, wherein said means for switching said quantizer at said picture boundary comprises means for switching from said one set of quantizer matrix tables to said another set of quantizer matrix tables without delaying encoding of said sequence of video data by said encoder.

4. The encoder of claim 3, wherein said means for dynamically switching further comprises a table set register within said quantizer adapted to control said switching of said quantizer from said one set of quantization matrix tables to said another set of quantization matrix tables.

5. The encoder of claim 1, wherein at least one table of said one set of quantization matrix tables comprises a default quantization matrix table pursuant to MPEG standard.

6. The encoder of claim 1, wherein multiple tables of said one set of quantization matrix tables comprise default quantization matrix tables pursuant to MPEG standard.

7. The encoder of claim 1, wherein at least one table of said another set of quantization matrix tables comprises a user's custom quantization matrix table.

8. The encoder of claim 1, wherein multiple tables of said another set of quantization matrix tables comprises a user's custom quantization matrix tables.

9. The encoder of claim 1, wherein each set of quantization matrix tables of said multiple sets of quantization matrix tables comprises at least one quantization matrix table, each quantization matrix table of said at least one quantization matrix table comprising one of a default quantization matrix table pursuant to MPEG standard or a user's custom quantization matrix table.

10. The encoder of claim 1, wherein each set of quantization matrix tables comprises an intra luminance table and a non-intra luminance table.

11. The encoder of claim 1, wherein each set of said multiple sets of quantization matrix tables comprises an intra luminance table, a non-intra luminance table, an intra chrominance table, and a non-intra chrominance table.

12. The encoder of claim 1, further comprising means for dynamically changing quantization matrix tables of a presently unused set of quantization matrix tables of said multiple sets of quantization matrix tables while quantizing said sequence of video data using said one set of quantization matrix tables or said another set of quantization matrix tables.

13. The encoder of claim 1, further comprising a compressed store interface for outputting a compressed bitstream produced by said encoder from said sequence of video data, said compressed store interface including means for dynamically outputting a quantization matrix extension start code in said compressed bitstream upon switching of said quantizer from using said one set of quantization matrix tables to using said another set of quantization matrix tables.

14. The encoder of claim 13, wherein said compressed store interface further comprises storage for also holding said multiple sets of quantization matrix tables.

15. The encoder of claim 13, wherein said means for dynamically outputting said quantization matrix extension start code comprises means for outputting said another set of quantization matrix tables in said compressed bitstream upon said quantizer switching from said one set of quantization matrix tables to said another set of quantization matrix tables.

16. The encoder of claim 13, wherein said means for dynamically outputting comprises means for outputting said quantization matrix extension start code in said compressed bitstream without pausing said encoding of said sequence of video data by said encoder.

17. The encoder of claim 13, further comprising means for changing quantization matrix tables in a presently unused set of said multiple sets of quantization matrix tables while said quantizer is quantizing said sequence of video data using said one set of quantization matrix tables or said another set of quantization matrix tables.

18. A method for encoding a sequence of video data, said method comprising:
providing storage within a quantizer of an encoder for holding multiple sets of quantization matrix tables at the same time, wherein said multiple sets of quantization matrix tables comprise separate, independent sets of quantization matrix tables, each set of quantization matrix tables comprising at least one intra matrix table and at least one non-intra matrix table;
quantizing the sequence of video data in a single pass using at least one set of quantization matrix tables of said multiple sets of quantization matrix tables; and
dynamically switching in real time said quantizing during said single pass from using said one set of quantization matrix tables to using another set of quantization matrix tables of said multiple sets of quantization matrix tables, wherein said dynamically switching occurs without requiring stopping of the encoding process; and
allowing updating of said one set of quantization matrix tables of said multiple sets of quantization matrix tables within said quantizer while said another set of quantization matrix tables is in use by said quantizer.

19. The method of claim 18, wherein said dynamically switching comprises switching said quantizing from using said one set of quantizer matrix tables to using said another set of quantizer matrix tables at a picture boundary of said sequence of video data.

20. The method of claim 19, wherein said switching of said quantizing at said picture boundary comprises switching from said one set of quantizer matrix tables to said another set of quantizer matrix tables without delaying encoding of said sequence of video data.

21. The method of claim 18, wherein at least one table of said one set of quantization matrix tables comprises a default quantization matrix table pursuant to MPEG standard or a user's custom quantization matrix table.

22. The method of claim 18, wherein at least one table of said another set of quantization matrix tables comprises a default quantization matrix table pursuant to MPEG standard or a user's custom quantization matrix table.

23. The method of claim 18, wherein each set of said multiple sets of quantization matrix tables comprises an intra luminance table and a non-intra luminance table.

24. The method of claim 18, wherein each set of said multiple sets of quantization matrix tables comprises an intra luminance table, a non-intra luminance table, an intra chrominance table, and a non-intra chrominance table.

25. The method of claim 18, further comprising dynamically changing quantization matrix tables of a presently unused set of quantization matrix tables of said multiple sets of quantization matrix tables while quantizing said sequence of video data using said one set of quantization matrix tables or said another set of quantization matrix tables.

26. The method of claim 18, further comprising producing a compressed bitstream employing a compressed store interface, said producing comprising dynamically outputting a quantization matrix extension start code in said compressed bitstream upon said switching from said one set of quantization matrix tables to said another set of quantization matrix tables.

27. The method of claim 26, wherein said dynamically outputting comprises outputting said quantization matrix extension start code in said compressed bitstream without pausing said encoding of said sequence of video data.

28. The method of claim 26, further comprising changing quantization matrix tables in a presently unused set of said multiple sets of quantization matrix tables while quantizing said sequence of video data using said one set of quantization matrix tables or said another set of quantization matrix tables.

29. An article of manufacture comprising:
a computer program product comprising computer usable medium having computer readable program code means therein for use in encoding a sequence of video data, said computer readable program code means in said computer program product comprising:
computer readable program code means for causing a computer to effect storing within a quantizer multiple sets of quantization matrix tables at the same time, wherein said multiple sets of quantization matrix tables comprise separate, independent sets of quantization matrix tables, each set of quantization matrix tables comprising at least one intra matrix table and at least one non-intra matrix table;

computer readable program code means for causing a computer to effect quantizing the sequence of video data in a single pass using at least one set of quantization matrix tables of said multiple sets of quantization matrix tables; and computer readable program code means for causing a computer to effect dynamically switching in real time said quantizing during said single pass from using said one set of quantization matrix tables to using another set of quantization matrix tables of said multiple sets of quantization matrix tables, wherein said dynamically switching occurs without requiring stopping of the encoding process; and computer readable program code means for causing a computer to effect allowing updating of said one set of quantization matrix tables of said multiple sets of quantization matrix tables within said quantizer while said another set of quantization matrix tables is in use by said quantizer.

* * * * *